United States Patent [19]

Montsinger

[11] Patent Number: 6,162,536
[45] Date of Patent: Dec. 19, 2000

[54] CONDUCTIVE LONG FIBER POLYVINYL CHLORIDE COMPOSITES

[76] Inventor: Lawrence V. Montsinger, 1837 Kilmonack La., Charlotte, N.C. 28270

[21] Appl. No.: 09/248,530

[22] Filed: Feb. 10, 1999

[51] Int. Cl.[7] .............................. D02G 3/00; B29C 35/10
[52] U.S. Cl. ..................... 428/372; 428/375; 428/378; 428/379; 264/495; 264/211; 264/171.13
[58] Field of Search ...................... 428/375, 372, 428/392, 379, 378; 264/495, 136, 140, 143, 171.13, 211, 477

[56] References Cited

U.S. PATENT DOCUMENTS

| | | | |
|---|---|---|---|
| 4,037,011 | 7/1977 | Hattori et al. | 428/294 |
| 4,169,186 | 9/1979 | Tazaki et al. | 428/406 |
| 4,559,262 | 12/1985 | Cogswell et al. | 428/294 |
| 4,566,990 | 1/1986 | Liu et al. | 252/503 |
| 4,614,678 | 9/1986 | Ganga | 428/74 |
| 4,944,965 | 7/1990 | Luxon et al. | 427/389.7 |
| 5,019,450 | 5/1991 | Cogswell et al. | 428/402 |
| 5,935,508 | 8/1999 | Fernyhough et al. | 264/495 |

*Primary Examiner*—William Krynski
*Assistant Examiner*—J. M. Gray
*Attorney, Agent, or Firm*—Miles B. Dearth

[57] ABSTRACT

Disclosed is a process for manufacturing a conductive fiber-PVC composite which exhibits less than $10^{12}$ hms/sq. resistivity. The process entails incorporating into rigid PVC under heat and shear, a composite of parallel, conductive long fibers embedded in a PVC-dispersible matrix. The process is conducted under the same melt process conditions encountered in the compound processing of rigid PVC, and the long conductive fibers are incorporated a long fiber composite of substantially parallel fibers embedded in a PVC dispersible matrix. The pellets comprise from about 20% to 80% by weight of conductive fiber and 80% to 20% PVC-dispersible thermoplastic.

17 Claims, No Drawings

CONDUCTIVE LONG FIBER POLYVINYL CHLORIDE COMPOSITES

FIELD OF INVENTION

The invention is directed to thermoplastic composites containing conductive fibers, in particular, a PVC matrix with incorporated long conductive fibers. The composites are useful as shaped thermoplastics that readily dissipate electrostatic charges, for example, safety flooring sheeting and tiles, electronic device components and housings, office equipment components, furniture, containers for handling, transporting and storing electronic components, and as substrates suitable for surface coatings using electrostatic powder deposition, for example decorative appearance automotive parts such as trim and, furniture components, and building and construction articles, and the like.

BACKGROUND OF THE INVENTION

Commodity thermoplastics are electrically non-conductive. Their inherent dielectric constant, $\epsilon_r$, can not be significantly altered by changing the polymer, hence additives are used to modify the matrix in order to increase the dissipation of static electricity, or, to render the bulk material sufficiently conductive to ground as molded articles made therefrom in order to accept an electrostatically applied coating material. Some approaches pertain to ESD coatings on plastic substrates which do not contain conductivity enhancing additives. As additives for plastics to increase conductivity, there may be mentioned conductive carbon black, and conductive carbon fibers.

The incorporation of fine denier metal fibers, such as steel or carbon graphite fibers into polycarbonate or ABS/polycarbonate thermoplastic matrices is known and provides good conductive properties without significantly detracting from the physical properties of the matrix. Long fiber (>2 mm length) composites of polycarbonate containing an effective amount of dispersed fibers of graphite or stainless steel are known.

Polyvinyl chloride provides an economical extrusion or molding resin for a variety of office equipment housings, profiles and the like, despite the relatively lower HDT. Particulate additives to provide improved ESD for polyvinyl chloride are known. The uniform dispersion of long conductive fibers in PVC presents problems associated with the broad melt transition of PVC, its thermal instability, high melt viscosity and problems associated with wetting out of fibers with PVC. Chopped fibers of length of a millimeter have been directly incorporated into PVC but the articles derived therefrom have poor physical properties, and many fiber ends that have stress concentrating effects. Moreover, the viscosity and relatively narrow thermal processing window for PVC renders it impractical for pultrusion processing, since high temperatures and dwell times have been observed to lead to unacceptable wetting, degradation and discoloration. It would be desirable to provide increased conductivity for PVC without the need to incorporate relatively high amounts of either conductive fillers/additives or short conductive fibers of length of 1 mm or less, so as to retain as much of the physical properties available from PVC without degrading the resin.

SUMMARY OF THE INVENTION

The invention is embodied in an improved PVC composite which exhibits less than $10^9$ Ohms/sq. resistivity, and a process for manufacturing the composite.

The composite is made by incorporating a conductive, long-fiber pultruded composite using a PVC-dispersible thermoplastic in the form chopped pellets into PVC under conventional PVC melt compounding techniques. The pelletized, pultruded composite comprises parallel, conductive long fibers of length 2–100 mm in a PVC-dispersible thermoplastic polymer matrix, having a specified degree of penetration (wet-out) of the conductive fibers of at least about 80%. The PVC-dispersible polymer for the pultrusion of conductive fiber is selected from those having a glass transition temperature no more than 20° C. higher than that of the PVC matrix to be combined therewith in forming the improved conductivity PVC composite. A pultruded continuous strand exiting the pultrusion process is chopped into pellets. The pellets have a fiber length equal to pellet length of from about 2 mm to 100 mm, preferably from 4 to 12 mm. In a preferred embodiment, the PVC is formulated with an additive that is antagonistic to the thermostability of the PVC-dispersible thermoplastic contained in the pellets. Acidic or basic compounds tolerable for PVC but tending to be prodegradants for the PVC-dispersible polymer are known and are readily selectable on the basis of the selected PVC-dispersible thermoplastic. The most preferred such antagonistic additive is selected from the organotin compounds. The antagonistic additive provides enhanced dispersion of the pellets into PVC.

The PVC composite according to the invention comprises 60% to 98% by weight of Polyvinyl Chloride compound, and from 2 to about 40% by weight of long fiber pultruded pellets, dispersed uniformly therein. The long fiber pultrusion comprises 20% to 80% of conductive fiber and 80% to 20% of thermoplastic that is dispersible in the polyvinyl chloride compound selected for the composite. Preferably conductive fiber is present at from 40% to 60% by weight of the pellets. The degree of unwetted fibers in the pellets is important and is at least about 50%, more critically at least 20%, as determined by the difference in the actual fiber content and the theoretical fiber content determined from equations disclosed in the Handbook of Pultrusion Technology, by Raymond W. Meyer, 1985, Chapman & Hall, N.Y. which is hereby incorporated by reference as is fully disclosed herein. With reference to theoretical fiber content, the calculations are seen on pp. 126&7. The actual fiber content is determined by the ash test, using weight measurements before and after burning in a muffle furnace to remove the organic polymer matrix.

In another aspect, the methods to make the long fiber conductive PVC composite are readily adapted from the conventional compound techniques which are known. The processing method chosen depends on the particular type of modified PVC compound selected. Generally, these processes entail melt blending PVC and any adjuvants under heat and shear, and in this invention there is provided direct addition of the conductive long fiber pellets. Melt processing techniques such as roll mills, Banbury mixers, Farrell mills, single screw extrusion, twin-screw extrusion, co-extrusion, injection molding, thick film calendaring and lamination, compression molding, and the like are suitable processing methods usable therewith.

DESCRIPTION OF THE PREFERRED EMBODIMENT

By conductive it is meant that the thermoplastic PVC composite has a surface resistivity of less than $1 \times 10^{12}$ Ohms/square, and a volume resistivity of less than $1 \times 10^{11}$ Ohms-cm, measured according to ASTM D-257 used in the art. Preferably, resistivity achieved in the practice of the invention is less than $10^{10}$ Ohms/sq., more preferably less than $10^7$ Ohms/sq., and most referred less than $10^6$ Ohms/square, depending on the percentage of conductive fibers in the PVC composite. Volume resistivity according to ASTM D-257 achievable by the PVC composite follows from the weight percent conductive fiber content. A volume resistivity of about $1 \times 10^{12}$ Ohms/cm can be seen when about 2% of long fibers are present. A volume resistivity of about $1 \times 10^{11}$ Ohms/cm or less, $1 \times 10^{10}$ Ohms/cm or less, $1 \times 10^8$ Ohms/cm or less, $1 \times 10^6$ Ohms/cm or less, and $1 \times 10^3$ Ohms/cm or less can be seen where, respectively, at least about 2% by weight, 3% by weight, 4% by weight, 5% by weight, and 7% by weight of conductive fibers are incorporated from the pultruded conductive fiber pellets. The achievement of this for Polyvinyl Chloride advances the ESD performance in terms of achieving a reduction in the amount of expensive conductive fibers required to reach the corresponding level of resistivity.

It is to be understood at the outset of the description which follows that persons of skill in the art may modify the invention here described while still achieving the favorable results of this invention. Accordingly, the description which follows is to be understood as being a broad, teaching disclosure directed to persons of skill in the appropriate arts, and not as limiting upon the present invention.

The conductive fiber pultrusion comprises from about 20% to 80% by weight of conductive fiber and 80% to 20% of a PVC-dispersible thermoplastic polymer selected so that either in the plasticized or unplasticized state, has a glass transition temperature no more than 20° C. higher than the selected PVC matrix in which the pultruded composite is to be dispersed. The term "disperses uniformly" means that the selected thermoplastic neat polymer or in a plasticized or alloyed state along with the fibers of the pultruded composite are melt processible in the selected PVC matrix compound and are readily dispersed to uniformity under the processing conditions for the selected PVC matrix compound resulting in a uniform mixture, without delaminating, or causing significant loss in physical properties of the PVC. The term "readily dispersed" means that in forming the long fiber composite, the mixture of long fiber pultruded pellets and the PVC compound becomes uniform within the processing window of the PVC compound defined by the working conditions of temperature, shear and dwell time, i.e., the available processing window, and that the uniformity is achieved without the onset of discoloration, gel formation and degradation associated with exceeding the processing window as is understood by those skilled in the art.

Suitable pultrusion processes for preparing the intermediate pellet concentrate are disclosed in U.S. Pat. Nos. 4,559,262 and 5,176,775, and 5,002,712, each of which are incorporated herein by reference. The resin selected for forming the pultruded conductive fiber composite is a resin that is dispersible thermoplastic. By PVC-dispersible is meant that the resin will uniformly disperse under melt processing conditions for PVC without delamination or serious loss of PVC physical properties. Complete compatibility is not required for the PVC-dispersible thermoplastic. The PVC-dispersible thermoplastic becomes the dispersed phase in the PVC matrix upon incorporation of the long fiber pellets into the PVC compound. The preferred PVC-dispersible thermoplastics are those which do not significantly reduce the heat distortion temperature (HDT) of rigid PVC and which do not discolor the PVC to a great degree, either initially or after long term exposure in-service.

Conventional pultrusion processes that achieve at least 50% wet-out of the conductive fiber is suitable for preparing the long conductive fiber-PVC-dispersible thermoplastic pellets used in the present invention. The degree of wet-out is characterized by measuring the actual fiber concentration according to an ash test. The theoretical fiber concentration for any pultruded composite used herein is related to the yield of fiber, number of rovings, and cross sectional area of the die in the relationship given in the Handbook of Pultrusion, with the exception that the Qr is the density of the thermoplastic melt, rather than solid.

In evaluating the degree of wet-out, the difference in the actual fiber concentration compared to the theoretical fiber concentration divided by the theoretical fiber concentration ×100 is the percent of void space; 100 minus the percent void space is the degree of wetted fibers. The percent of wetted fibers for the pultruded composite used in the present invention is at least 50%, and more preferred to be at least 80%, because the breakdown of pellets releasing unbonded fiber is minimized when the degree of wetting is as specified.

Pultrusion processes are outlined in J. E. Sumerak, Modern Plastics, 62(3), p. 58 (1985) incorporated herein by reference. In general, a pultrusion apparatus has fiber roving supply means, preferably in the form of a creel mounting a plurality of packages of fiber material, for supplying continuous roving of fiber filaments; advancing means for advancing fiber from the creel along a predetermined path of travel; thermoplastic supply means, preferably in the form of an extruder, for supplying molten, heated PVC dispersible thermoplastic material; and means disposed along the predetermined path of fiber travel and operatively communicating with the extruder for directing advancing fiber in one direction and for receiving a flow of heated thermoplastic material and directing the flow of heated thermoplastic material, preferably in a direction opposite to and in intimate impregnating enclosure of the advancing heated fiber moving in the one direction, as is taught in the '775 process.

As used in this description, the term "continuous filament" or "roving" means any plurality of gathered fibrous material having filaments in lengths greater than five feet. Typically, commercially available rovings are bundles of conductive fibers, each fiber of up to twenty feet in length and gathered into the continuous roving that is wound on spools.

In pultrusion methods, typically, multifilament bundles are supplied by conductive fiber producers in the form referred to in the art as roving, tow or band, and may be more or preferably, less twisted depending upon the specific material and manner of handling prior to use in pultruding processes. Desirably, the creel will deliver the fiber roving into the pultrusion impregnation chamber with minimal twist, providing less interference with impregnation, interpenetration or enclosure of the fiber bundles. The fiber creel may be designed in a number of different ways to accomplish the intended result. The selection of a specific creel design is left to the person of skill in the arts of handling fiber tow or bands.

Fiber rovings are drawn from the creel along a path of travel through an impregnation vessel, along appropriate guide rolls, bars and the like to one or more sets of drawn rolls or an endless, product gripping conveyor (the puller). As is understood in the pultrusion art, conductive fiber materials may be pulled through an apparatus such as that described, and generally may not be pushed. Further, means for controlling the tension in the fiber may be appropriate or required at various points along the path in order to assure orderly passage of the fiber, and will be provided as deemed necessary by persons skilled in the arts of transporting fiber materials. Thus there may optionally be a pretensioning system, for example immediately in advance of impregnation vessel, and thereafter a tension system immediately after a heater.

As fiber rovings advance along the path through the process, thermoplastic material is continually prepared by being preheated or dried, as appropriate or necessary, in a drier and passed into an extruder where it is melted. The drier and extruder may be of conventional design for handling thermoplastic materials of the class selected, and function for melting thermoplastic material and delivering molten thermoplastic material under pressure and at predetermined flow rate.

Conductive fiber roving is brought downward into an impregnation column arranged for downward passage of fiber therethrough and for upward movement of thermoplastic material therewithin. The column is heated by conventional means such as cartridge electrical resistance heaters embedded in the structure of the column. The counter movement gives rise to the shear forces between the advancing heated fiber and the directed flow of thermoplastic material which, in accordance with this invention, promote wetting-out of the fiber by intimate impregnating enclosure of the fibers in the thermoplastic material. Additionally, the path along which the fiber roving is guided within the impregnation column is such as to cause the thermoplastic material entrained in downward movement to be squeezed between the fibers. The gradual converging of the fibers moving downwardly first draws thermoplastic material into the space between the relatively planar spread rovings, and then squeezes the thermoplastic material into intimate contact with the fibers, yielding good wetting of the fibers with the thermoplastic. The squeezing force is in part a function of contact of the fibers with the turning guide as the fiber rovings are turned through ninety degrees from vertical to horizontal about the turning guide as taught in U.S. Pat. No. 5,175,776. The advancing rovings approach a narrowing passage to the outlet, and compressive fluid forces impinge on the passing resin impregnated roving. The preferred pultrusion process is counter-current and readily provides pellets of conductive fiber and PVC-dispersible matrix with desired fiber content and conversion efficiency. The counter-current process, and most conventional pultrusion processes provide the minimum specified degree of fiber wet-out of the PVC-dispersible thermoplastic. Pellets having at least the minimum specified wet-out can be uniformly dispersed in the PVC thermoplastic matrix despite the relatively higher viscosity and narrow processing window of PVC, provided that the glass transition temperature of the pultrusion thermoplastic is no more than 20° C. higher than the PVC (either as plasticized or unplasticized, as the case may be) thereby enhancing the physical and conductivity properties of the conductive PVC composite. Preferably, the glass transition temperature of the PVC-dispersible pultruded thermoplastic is equal to or less than the Tg of the PVC used. Most preferably, the glass transition temperature of the PVC-dispersible pultruded thermoplastic is at most 10° C. lower than the Tg of the PVC used. The PVC composite generally comprises from 60% to 98%, preferably from 85% to 97% by weight polyvinyl chloride, including compounding additives (impact modifier, filler, lubricant, stabilizer, plasticizer and the like). The conductive long fiber composite is incorporated in the PVC in an amount of from 2% to 40% by weight, and the PVC composite contains overall from 1% to 15% of conductive fiber. The preferred PVC composite contains from about 92% to 97% by weight PVC and adjuvant materials, and from 3% to 8% of long conductive fiber composite, where the composite fiber concentrate contains from 20% to 60% conductive fibers by weight, more preferably from 30% to 60% by weight of conductive fibers. According to the desired surface resistivity for the PVC composite, the conductive fiber concentration in the pellet concentrate, the amount of long conductive fiber in the final product can range from $0.8 \times 15\%$ to $0.2 \times 2\%$ by weight. The preferred PVC composite comprises 94% to 97% PVC and adjuvants, and $0.6 \times 6\%$ to $0.3 \times 3\%$ conductive fiber.

The preferred pultrusion method for producing the long conductive fiber concentrate generally comprises the steps of pulling continuous conductive filament rovings through an impregnation chamber containing heated PVC-dispersible thermoplastic, optionally, and preferably also a PVC miscible plasticizer, continuously supplied thereto. The direction of the advancing rovings is opposite the flow of PVC-dispersible thermoplastic thermoplastic in intimate impregnating enclosure of the advancing fiber. This arrangement provides shear forces between the advancing wetted roving to promote interpenetration, which is referred to as "wet-out". The degree of wet-out has been correlated to flexural modulus, since it is readily shown that the maximum flex modulus is obtained at 100% wet-out, and a lesser degree of wet-out can be seen in flex modulus levels which are less than the maximum attainable for a particular fiber/thermoplastic pultruded composite. The long, conductive fiber pultruded pellets used in the present invention should exhibit at least 50% of its maximum attainable flex modulus. This means that a minimum fiber wet-out is needed to provide a uniform dispersion of the pellets in the PVC matrix. The uniform dispersion is critical for attaining the increased conductivity of the PVC/pellet combination after melt-processing. The preferred pultrusion process can attain 75%, and up to 90% and higher, flex modulus in relation to the maximum flex modulus of a 100% wetted fiber composite of that composition.

The continuous conductive fiber roving material is a combination of from 4 to 32 individual multifilament rovings joined during the pultrusion. A typical stainless steel roving, tow or band emerging from the process is one which contains typically about 5,000 to 20,000 filaments. Suitable stainless steel rovings are commercially available from Baekert Ag, Atlanta, Ga. Stainless steel filaments typically have no sizing present and diameters are suitably in a range of from about 6 to about 16 microns. The preferred diameter of stainless steel rovings used herein is about 8 microns, yielding about 106 yards per pound with 12,000 filaments per roving at a density of 8 grams/cubic centimeter. Carbon fiber rovings having about 12,000 filaments yields about 575 yards per pound, have a density of about 1.75 grams/cubic centimeter and typically are available in 12,000 filaments/roving. Carbon fibers containing a resinous sizing, for example a cured epoxy sizing, should be heat treated to burn off the sizing prior to pultruding. Suitable carbon fiber rovings are commercially available from Amoco, Inc., and Toray Industries.

The PVC-dispersible polymer used in the pultrusion to make the pellets include those polymers dispersible in unplasticized PVC (uPVC). Suitable uPVC-dispersible polymers suggested herein are thermoplastic polyurethane; styrene-acrylonitrile copolymer, alpha methyl styrene-styrene-acrylonitrile terpolymer; a polymer of alpha methyl styrene-styrene-N-cyclohexyl maleimide; N-phenylmaleimide; polymethylmethacrylate, polymethyl methacrylate-methyl acrylate copolymer, a polymethyl-methacrylate homopolymer, a polymer comprising at least about 50% by weight polymethylmethacrylate and other (meth)acrylates; imidized polymethyl methacrylate, styrene-maleic anhydride polymer, imidized styrene-maleic anhydride polymer, acrylic-imide copolymer, acrylonitrile-methylmethacrylate copolymer, acrylonitrile-acrylate-polybutadiene graft copolymer, alpha methyl styrene-methylmethacrylate-acrylonitrile terpolymer, alpha-methyl styrene-styrene-methylmethacrylate terpolymer, alpha methyl styrene-methylmethacrylate copolymer, alpha methyl styrene-acrylonitrile copolymer, alpha methyl styrene-methylmethacrylate graft copolymer on polyacrylate rubber, polycarbonate, and brominated polycarbonate, polyvinylpyrrolidone, chlorinated polyethylene (25–43% chlorine), Paraloid® KM-653, BTA-733 acrylics from Rohm and Haas, or Kanegafuchi B-56 and B-22KO MBS; polybutadienes jointly graft-copolymerized with acrylonitrile and styrene (ABS), low rubber types are preferred; nitrile rubber blended with SAN; polybutadienes jointly graft-copolymerized with acrylonitrile and alpha-methyl styrene; ethylene-propylene-diene rubber, referred herein as EPDM graft-copolymerized with vinyl chloride; PVC homopolymer plasticized with 10–40 phr of plasticizer combined with melt strength improver such as an acrylic processing aid (Paraloid® KM330, for example; these above listed just to name some. The preferred u-PVC-dispersible thermoplastics used in the pultruded long conductive fiber composite are thermoplastic polyurethane, and polyacrylates. The above PVC-dispersible polymers can be alloyed with compatible flexibilizing polymer, monomeric plasticizer and polymeric plasticizer in order to provide a melt processing range enabling uniform dispersion in the selected PVC matrix.

In the preferred pultrusion process, the opening in the final die through which the conductive fiber/PVC-dispersible thermoplastic composite product passes from the impregnation column is such as to control the polymer to fiber ratio in the final product and the shape of the cross section of the product. The ratio of polymer to fiber may be in the range of from about 0.25 to about 4.0 to 1.0. The die shape may be whatever is desired, within reasonable limits, and is preferably a round cross section. The preferred pultrusion process can yield a composite issuing therefrom that exhibits a slight swelling indicating that the flow of thermoplastic material from the die is partly due to pressure (extrusion) and partly due to entrainment with the moving fiber (pultrusion). Due to the short residence time in the column, the operating temperature of the column may be up to fifty degrees Fahrenheit higher than the normal processing temperature of the thermoplastic material used. In such event, volatile components of the thermoplastic material may be driven off in the column and rise to pre-impregnate the downwardly moving fibers.

The continuous pultrusion is allowed to cool in ambient air or passed through a sufficient cooling area where it may be impinged upon by flowing cooling air, or water bath, then passed through a pulling station and advanced to a cutter which chops or cuts the advancing, essentially infinitely long, product into desired short lengths. Typically, a pellet will be a body of material having a generally circular cross sectional configuration and a length greater than twice the diameter of the cross sectional diameter of the body, with reinforcing fibers extending through the body. The reinforcing fibers in such a pellet have essentially the same length as the pellet and may, in accordance with this invention, be substantially more closely packed than has been the case heretofore. Pellets and the percentage of conductive fiber by weight of the pellet may be as high as eighty percent.

In the specification of U.S. Pat. No. 5,176,775, incorporated herein by reference, there has been set forth a preferred pultrusion method and, although specific terms are used, the description thus given uses terminology in a generic and descriptive sense only and not for purposes of limitation, and is the preferred pultrusion method to make the long conductive fiber-PVC-dispersible thermoplastic concentrate used in this invention. A particularly preferred pultrusion apparatus is disclosed in application Ser. No. 08/933,454 which is hereby incorporated by reference.

Polyvinyl chloride polymers are well known and commercially available worldwide. Polyvinyl chloride polymers contemplated for use in the present invention include those prepared in a variety of ways. PVC homo- or co-polymers can be prepared by polymerization methods including: mass, suspension, dispersion, and emulsion processes. A mass process is described in U.S. Pat. No. 3,522,227. A phase inversion process may also be used and is disclosed in U.S. Pat. No. 3,706,722. A useful skinless, suspension PVC resin is taught in U.S. Pat. No. 4,711,908, in particular example 4 in that disclosure. Preferably, PVC used herein is suspension PVC or mass PVC. Suspension or mass PVC resin used herein is a particulate homopolymer or rigid copolymer resin having a particle size average ranging from about 70 micron to 250 microns.

Polyvinyl chloride copolymers can be advantageously employed for the PVC-dispersible thermoplastic of the pultruded composite of conductive fibers. Suitably, at least about 10% by weight of comonomers should be used, such comonomers that may be included up to 80% by weight of the PVC resin product in are the olefins, unsaturated carboxylic acids such as acrylic acid, methacrylic acid, ethacrylic acid, a-cyanoacrylic acid, and the like; esters of acrylic acid, for example, methyl acrylate, ethyl acrylate, butyl acrylate, octyl acrylate, cyanoethyl acrylate, and the like; vinyl esters such as vinyl acetate and vinyl propionate; esters of methacrylic acid, such as methyl methacrylate, ethyl methacrylate, hydroxyethyl acrylate, butyl methacrylate, and the like; nitriles, such as acrylonitrile and methacrylonitrile; acrylamides, such as methyl acrylamide, N-methylol acrylamide, N-butoxy methacrylamide, and the like; halogen containing vinyl monomers such as vinyl fluoride, vinylidene fluoride, and vinyl bromide; vinyl ethers such as ethylvinyl ether, chloroethyl vinyl ether and the like; the vinyl ketones, styrene derivatives including amethyl styrene, vinyl toluene, chlorostyrene; vinyl naphthalene; cross-linking monomers such as diallyl phthalate, trimethylol propane triacrylate, allyl methacrylate and the like; allyl and vinyl chloroacetate, vinyl acetate, vinyl pyridine, and methyl vinyl ketone; olefins such as ethylene and propylene; and other copolymerizable monomers or mixtures of monomers having suitable reactivity ratios with vinyl chloride and known to those skilled in the art. Particularly preferred for the matrix PVC for which pellets are incorporated is a polyvinyl chloride homopolymer, of good commercial grade that is substantially free of gel particles and crosslinks.

The inherent viscosity (I.V.) (ASTM D-1243) of polyvinyl chloride, used in this invention generally ranges from about 0.3 to about 4.0, with a preferred resin being suspension resin with I.V. range of from about 0.35 to about 1.2 and a more preferred I.V. range of from about 0.5 to about 1.1. Two PVC polymers each having a different average molecular weight can be employed.

The preferred additive imparting degradative effects on the PVC-dispersible thermoplastic in the pultruded, conductive, long-fiber composite include the alkyltin compounds such as dimethyl tin-bis isooctylthioglycolate (methyltin), di-butyltin-bis-isooctylthioglycolate (butyltin), octyltin, mixed metal alkyltins, dialkyl tin di-carboxylates, methyltin mercaptides, butyltin mercaptides, dialkyl tin bis (alkyl mercaptocarboxylate) including di-n-octyltin-S,S'-bis (isooctyl mercaptoacetate), and butylthiostannoic acid, and mixtures thereof. Any alkylated tin having features such as low toxicity e.g. higher alkyl types, FDA approval, USP class 6 approval, good color, clarity and compatibility, low plate-out on equipment, and non-staining properties are desirable and preferred for use in this invention. Other useful stabilizers include metal or mixed metal soaps such as calcium/zinc soap stabilizers. Examples of suitable calcium soaps are calcium stearate, calcium laurate, calcium oleate, calcium palmitate, calcium octanoate, and calcium benzoate. Calcium stearate or combinations with stearic acid are preferred calcium soap stabilizer compositions. Examples of suitable zinc soaps are zinc stearate, zinc laurate, zinc palmitate, zinc 2-ethyl hexoate, zinc octanoate, zinc oleate, and zinc benzoate, and mixtures thereof. Zinc stearate is a preferred zinc soap. Lead or cadmium containing heat stabilizers are preferably absent in a layer having direct food contact. Metal soaps can be used at levels ranging from about 0.5 to 10 phr, preferably from about 1 to about 5 phr.

Other adjuvants include co-stabilizers for PVC, for example, phosphite stabilizers, polymeric phosphites, thioesters such as dilauryl thiodipropionate and beta-diketones. Plasticizing co-stabilizers known in the art can be optionally included for improved heat stability. Exemplary co-stabilizing plasticizers include epoxy derivatives such as epoxidized soybean oil and epoxidized linseed oil. Liquid stabilizing plasticizers are preferably absent or are present, at from 0.5 to about 10 phr, preferably from 1 to 5 phr. Plasticizers for PVC can be included in the PVC matrix directly or by way of inclusion in the pultruded, conductive long-fiber composite incorporated into PVC. Representative plasticizers are phthalates, adipates, trimellitates, phosphates, azealates, sebacates, chlorinated polyethylene (<43% chlorine). Plasticizers are listed in the Encyclopedia of Chemical Technology, 4th Ed., Vol. 19, pp. 258–280, incorporated herein by reference. For rigid conductive long fiber composites, little or no plasticizer (less than 4%) is used. For semi0rigid, and flexible composites, the type and amount of plasticizer is a matter of choice, and is well established in the art of conventional PVC compounding.

The PVC matrix is formulated as a compound typically in the practice of the present invention and contains conventional PVC additives in conventional amounts. Thus, various conventional impact modifiers, antioxidants, thermal stabilizers, lubricants such as paraffin, polyethylene, and stearic acid; various processing aids such as polyacrylates; various UV inhibitors such as substituted benzotriazoles and benzophenones; and the like, can be utilized.

Still further adjuvants for polyvinyl chloride are the various fillers and pigments utilized in PVC in conventional amounts as high as 300 parts by weight filler "per hindered weight parts" (phr) PVC. More preferred amounts of fillers are less than 150 phr or less based on 100 parts PVC resin. Examples of fillers include calcium carbonate, clay, silica, the various silicates, talc, carbon black, mica, and the like. Flame retarding fillers are also suitable, such as hydrated alumina, and other endothermic flame retarding additives. Examples of pigments include titanium dioxide and carbon black, and many others to impart the desired color. Generally, the amount of pigment included is less than 50 phr (parts per hundred parts PVC resin).

The various additives, fillers, pigments, and the like, are generally added and blended in a conventional manner. The melt processing step of the present invention to manufacture PVC-long conductive fiber composites of the present invention can be carried out by adding PVC resin, either in pellets or powder form, plus desired additives and the long conductive fiber composite pellets in a mixer, for example a Henschel® mixer, and then this combination can be processed on a two-roll mill into a sheet an cubed or the mixture can be processed on an extruder into pellets or directly into a finished shaped article. In general, any conventional compounding equipment such as a Banbury mixer, two-roll mill, extruder, injection molding machine, kneader-pelletizer, etc., can be used. A compounding extruder under the Buss® trademark is well adapted for the melt processing mixing operation. Pellets of the conductive PVC composite are later molded into conductive articles of various shapes, for use in the aforementioned exemplary articles.

The conductive long fiber pultruded composite used in the present invention can advantageously contain a minor amount of plasticized PVC. By "minor amount" is meant that the PVC-dispersible thermoplastic polymer is the continuous phase of the mixture and the plasticized PVC is dispersed in the continuous phase. Plasticizer amounts higher than about 20 wt. % in the PVC-dispersible thermoplastic polymer can give rise to a co-continuous phase, depending on the miscibility of the blend. Thermoplastic polyurethane and poly(meth)acrylate polymers are the most preferred PVC-dispersible thermoplastic polymers used in preparing the pultruded conductive long-fiber pellets. Plasticizers for the PVC-dispersible thermoplastic polyurethanes include the phthalates and adipate plasticizers. In a preferred embodiment, 70–95% PVC-dispersible thermoplastic blended in the extruder with 5–30% plasticizer is utilized as the matrix for the pultrusion. The presence of plasticizers which are compatible with both PVC and the PVC-dispersible thermoplastic are preferred to aid in the dispersion of the pellets in PVC, and lower the attrition of fiber, preserving a higher average fiber length in the PVC composite. The higher average fiber length has been found to provide improved conductivity improvement, enabling the reduction in the percentage of conductive fibers needed to achieve the desired conductivity enhancement.

When a reduction in the modulus of the PVC composite is to be avoided, preferred PVC-dispersible polymers can be selected from among PVC-dispersible heat distortion temperature (HDT) improving agents for PVC. Examples of such preferred PVC-dispersible HDT improvers suitable therefore, include styrene-acrylonitrile copolymer, alpha methyl styrene-styrene-acrylonitrile terpolymer, a polymer of alpha methyl styrene-styrene-N-cyclohexyl maleimide, N-phenylmaleimide, imidized polymethyl methacrylate, post-chlorinated polyvinyl chloride, styrene-maleic anhydride polymer, imidized styrene-maleic anhydride polymer, acrylic-imide copolymer, imidized PMMA, acrylonitrile-methylmethacrylate copolymer, acrylonitrile-acrylate-polybutadiene graft copolymer, alpha methyl styrene-methylmethacrylate-acrylonitrile terpolymer, alpha-methyl styrene-styrene-methylmethacrylate terpolymer, alpha methyl styrene-methylmethacrylate copolymer, alpha methyl styrene-acrylonitrile copolymer, alpha methyl styrene-methylmethacrylate graft copolymer on polyacrylate rubber, polycarbonate, and brominated polycarbonate. The aforementioned polymers are commercially available from a variety of vendors listed in annual Modern Plastics Buyers Guides.

The rigid conductive PVC composite is generally impact toughened. The suitable impact modifiers include acrylonitrile butadiene styrene terpolymers (ABS) such as available from GE Plastics Inc. under the Blendex® trademark, and methacrylate butadiene styrene polymer (MBS). Other impact modifiers are disclosed in Plastics Compounding, Nov./Dec., 1983: "Update: Impact Modifiers for Rigid PVC," by Mary C. McMurrer. Impact modifiers generally contain a rubbery core component including polybutadienes jointly graft-copolymerized with styrene and methyl methacrylate (MBS). Paraloid® KM-653, BTA-733 from Rohm and Haas, or Kanegafuchi B-56 and B-22KO MBS types; polybutadienes jointly graft-copolymerized with acrylonitrile and styrene (ABS), low rubber types are preferred; nitrile rubber blended with SAN; polybutadienes jointly graft-copolymerized with acrylonitrile and alpha-methyl styrene; ethylene-propylene-diene rubber, referred herein as EPDM graft-copolymerized with vinyl chloride, EPDMs jointly graft-copolymerized with styrene and acrylonitrile, polybutadienes graft-copolymerized with styrene, methyl methacrylate and acrylonitrile (MABS); acrylate impact modifiers such as those believed to be polybutyl acrylate graft-copolymerized with methyl methacrylate, (KM®-323B, KM®-330 Trademark of Rohm and Haas); polybutyl acrylate jointly graft-copolymerized with methyl methacrylate and styrene, polybutyl acrylate graft polymerized with acrylonitrile and styrene (Blendex® 975,977, or 979- Trademark of GE Plastics, Inc.); butyl rubbers graft-copolymerized with vinyl chloride, block copolymers of styrene-butadiene-styrene, radial block copolymers of styrene and butadiene, styrene-butadiene rubbers, vulcanizable acrylate rubbers, EPDMs and the like. Chlorinated polyethylene (CPE) is an exemplary impact modifier. Percent chlorine content preferably ranges from about 25% to 40%. CPE containing 25% and 36% are commercially available from Dow Chemical, Inc.

Thermoplastic polyurethanes are available from a variety of suppliers, including BFGoodrich, Brecksville, Ohio, under the Estane® mark. TPU is available from Bayer under the Texin® and Desmophane® marks, and elastomeric TPU under the Bayflex® mark; and from Dow Chemical under the Pellethane® mark. The thermoplastic polyurethanes can be the polyester or polyether type. Polyester urethanes based on poly tetramethylene ether glycol and diphenyl methylene-4,4'-diisocyanate are representative. The polyurethanes typically are processible at from 320° F. to 410° F., and range in hardness from Shore 75A to 75D. Chain extended polyethers are also suitable for the pultruded matrix. A chain extended polymer comprising (A) a low molecular weight polyether oligomer having two reactive moieties and an average molecular weight from about 200 to about 10,000 wherein the oligomer is a homopolymer or a copolymer of two or more copolymerizable cyclic ether monomers and (B) from about 0 moles to about 35 moles of a modifier for each mole of low molecular weight polyether and (C) a chain extender; with the proviso that the number of moles of chain extender per mole of the sum of the number of moles of low molecular weight polyether oligomer plus the number of moles of modifier is from about 0.95 to about 1.06. In a preferred embodiment the number of moles of chain extender per mole of the sum of the number of moles of low molecular weight polyether oligomer plus the number of moles of modifier is from about 0.97 to about 1.03. By low molecular weight oligomer, it is meant that the polyether will have an average molecular weight from about 200 to about 10,000 and preferably from about 500 to about 5000, as determined by end group analysis. The reaction of the low molecular weight oligomer with a chain extender will furnish a chain extended polymer having melt indices from 0.05 to 110 grams per ten minutes. The preferred melt index range of the chain extended polymer will be from about 1.0 to 65 grams/10 minutes. The melt index is determined according to ASTM D-1238 Procedure A at a barrel temperature of 190° C. and an 8700 gram piston load.

In a preferred embodiment of a chain extended the low molecular weight oligomer employed is a polymer of ethylene oxide. In an alternative embodiment the low molecular weight polyether oligomer is end capped with ethylene oxide or ethylene imine thereby providing an oligomer which will have two primary moieties. Another chain extended PVC-dispersible polymer is a polyetheresteramide block copolymer, commercially available from Atochem America.

Articles made from the conductive fiber-PVC composite, as shaped thermoplastic articles formed in conventional extrusion and molding process, and which exhibit advantageous conductive properties, include for example, electronic device components and housings, office equipment components, furniture, containers for electric components, and many molded or extruded parts which owing to their conductivity are eminently suitable for electrostatically applied surface coatings. The electrostatic powder deposition coating of the substrates made by the process of the invention enable powder coating the conductive PVC thermoplastic, especially where weatherable, colorized decorative appearance parts are needed. One example of electrostatic coated versions is with automotive appearance parts, such as side-moldings, fascia, and interior parts which are color-matched to the body color.

I claim:

1. A process for manufacturing a conductive, long conductive fiber-PVC thermoplastic composite material comprising from 60% to 97% by weight of plasticized or unplasticized polyvinyl chloride as the continuous phase, and incorporated in said polyvinyl chloride, from 3% to 40% by weight of chopped pultruded pellets of length 2 mm to 100 mm, said pellets comprising from 20% to 80% by weight of conductive fiber, and 80% to 20% of a PVC-dispersible thermoplastic polymer as the matrix, said pellets having at least 50% wet-out of said fibers with said PVC-dispersible thermoplastic polymer, and wherein the glass transition temperature of said PVC-dispersible polymer is not more than 20° C. higher than the glass transition temperature of said polyvinyl chloride, said process comprising melt processing under heat and shear, rigid polyvinyl chloride resin and pellets comprising parallel, long conductive fibers embedded in a PVC-dispersible thermoplastic matrix, dispersing said long conductive fibers uniformly in the mass of said rigid polyvinyl chloride resin and cooling the mass to form said long conductive fiber-PVC thermoplastic composite which exhibits less than $10^9$ Ohms/sq. resistivity.

2. The process of claim 1 wherein said conductive fibers incorporated in said PVC have a length from about 2 mm to 100 mm.

3. The process of claim 1 wherein said conductive fibers incorporated in said PVC have a length from about 4 mm to 20 mm.

4. The process of claim 1 wherein said conductive fibers incorporated in said PVC have a length from about 6 mm to 12 mm.

5. The process of claim 1 wherein said PVC composite further comprises an organotin compound.

6. The process of claim 1 wherein said PVC-dispersible matrix containing conductive fibers, prior to dispersing into said resin, comprises a resin selected from the group consisting of thermoplastic polyurethane, styrene-acrylonitrile copolymer, alpha methyl styrene-styrene-acrylonitrile terpolymer, a polymer of alpha methyl styrene-styrene-N- cyclohexyl maleimide, N-phenylmaleimide, imidized polymethyl methacrylate, styrene-maleic anhydride polymer, imidized styrene-maleic anhydride polymer, acrylic-imide copolymer, imidized PMMA, acrylonitrile-methylmethacrylate copolymer, acrylonitrile-acrylate-polybutadiene graft copolymer, alpha methyl styrene-methylmethacrylate-acrylonitrile terpolymer, alpha-methyl styrene-styrene-methylmethacrylate terpolymer, alpha methyl styrene-methylmethacrylate copolymer, alpha methyl styrene-acrylonitrile copolymer, alpha methyl styrene-methylmethacrylate graft copolymer on polyacrylate rubber, polycarbonate, and brominated polycarbonate.

7. The process of claim 1 wherein said long conductive fiber composite is incorporated in said polyvinyl chloride in an amount of from 2% to about 15% by weight of fiber.

8. The process of claim 1 wherein said long conductive fiber composite is incorporated in said polyvinyl chloride in an amount of from 3% to about 6% by weight of fiber.

9. The process of claim 1 wherein said pellets comprising parallel, long conductive fibers embedded in a PVC-dispersible thermoplastic matrix comprise from 20%–80% by weight conductive fibers aligned in parallel orientation.

10. The process of claim 9 wherein said pellets comprising parallel, long conductive fibers embedded in a PVC-dispersible thermoplastic matrix comprise from 30%–80% by weight conductive fibers aligned in parallel orientation.

11. The process of claim 10 wherein said pellets comprising parallel, long conductive fibers embedded in a PVC-dispersible thermoplastic matrix comprise from 50%–70% by weight conductive fibers aligned in parallel orientation.

12. A conductive long fiber polyvinyl chloride thermoplastic composite, comprising from 60% to 97% by weight of plasticized or un-plasticized polyvinyl chloride as the continuous phase, and incorporated in said polyvinyl chloride, from 3% to 40% by weight of chopped pultruded pellets of length 2 mm to 100 mm, said pellets comprising from 20% to 80% by weight of conductive fiber, and 80% to 20% of a PVC-dispersible thermoplastic polymer as the matrix, said pellets having at least 50% wet-out of said fibers with said PVC-dispersible thermoplastic polymer, wherein said composite exhibits a resistivity of less than $10^9$ Ohms/sg. and wherein the glass transition temperature of said PVC-dispersible polymer is not more than 20° C. higher than the glass transition temperature of said polyvinyl chloride.

13. The conductive long fiber polyvinyl chloride composite of claim 12 wherein said pellets have a length of from 4 mm to 12 mm.

14. The conductive long fiber polyvinyl chloride composite of claim 12 wherein said pellets have a length of from 6 mm to 10 mm.

15. The conductive long fiber polyvinyl chloride composite of claim 12 wherein said polyvinyl chloride is plasticized.

16. The conductive long fiber polyvinyl chloride composite of claim 12 wherein said PVC-dispersible thermoplastic is plasticized.

17. The conductive long fiber composite of claim 12 wherein the degree of conductive fiber wet-out is at least about 80%.

* * * * *